June 29, 1937.  R. G. LUCKS  2,085,225
PARING MACHINE
Filed May 7, 1934   5 Sheets-Sheet 1
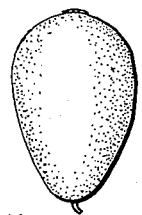 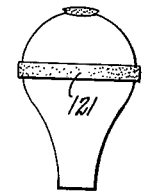 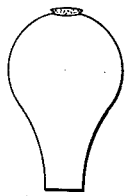 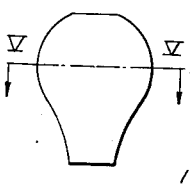 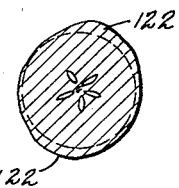
Fig. 1.   Fig. 2.   Fig. 3.   Fig. 4.   Fig. 5.
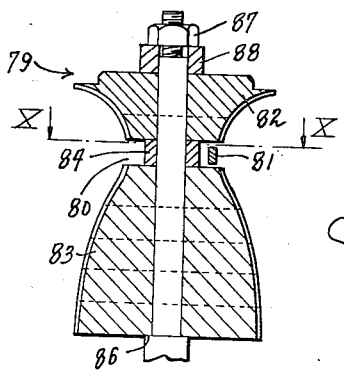
Fig. 9.
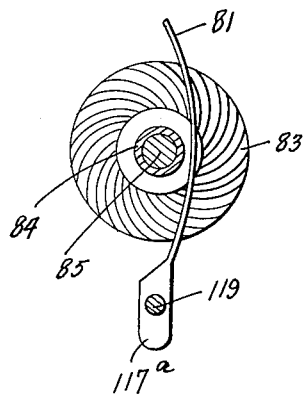
Fig. 10.
Fig. 11.
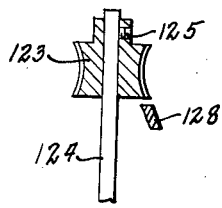
Inventor
Roy G. Lucks
By Lyon & Lyon
Attorneys

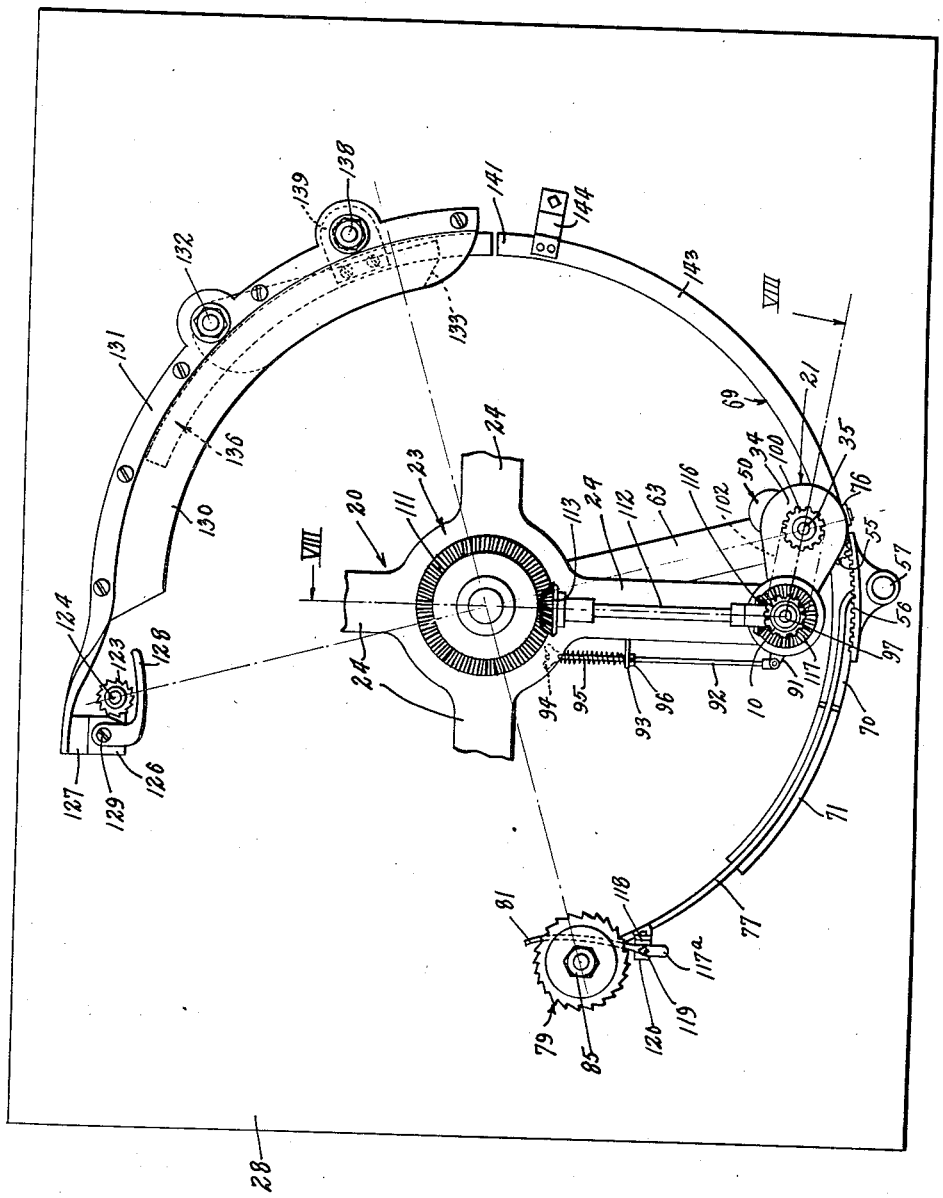

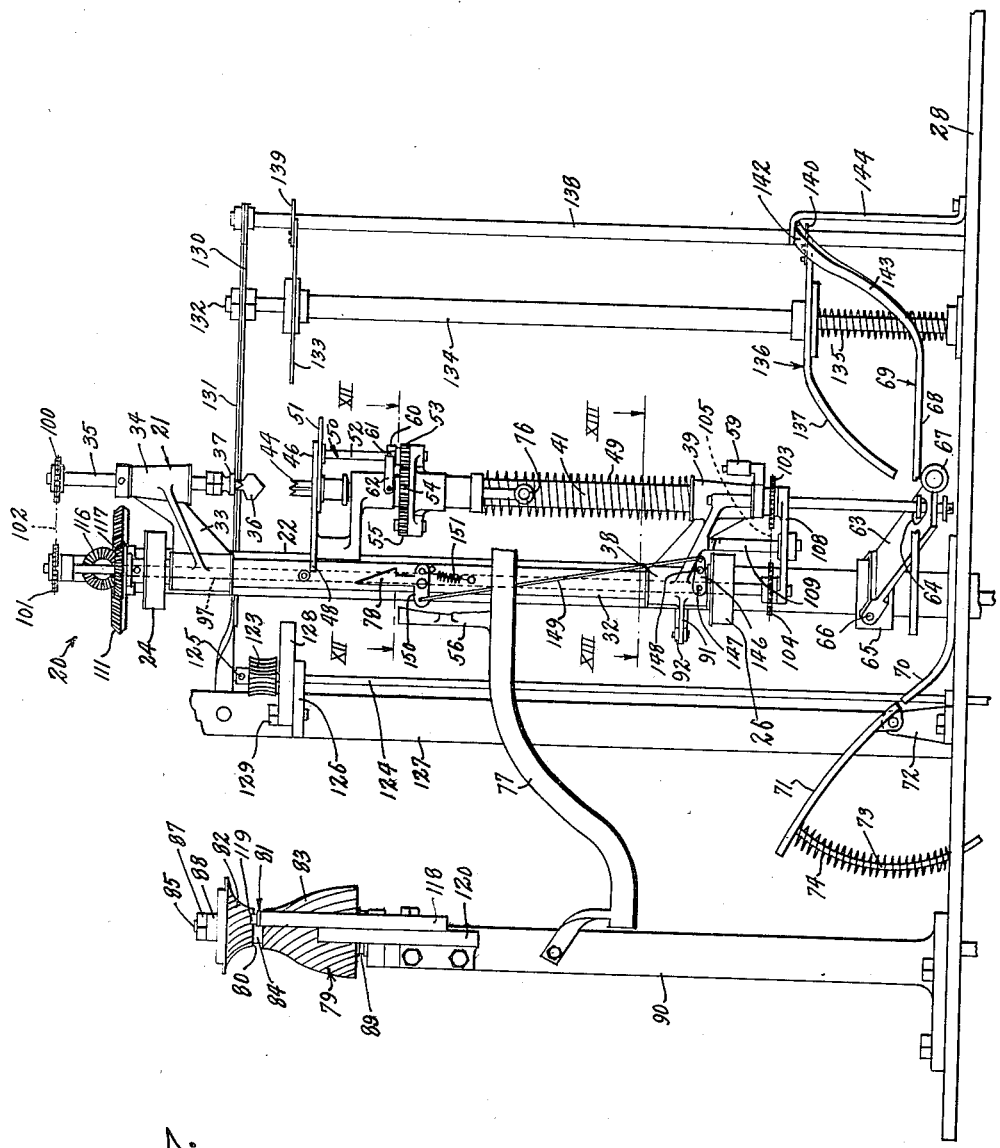

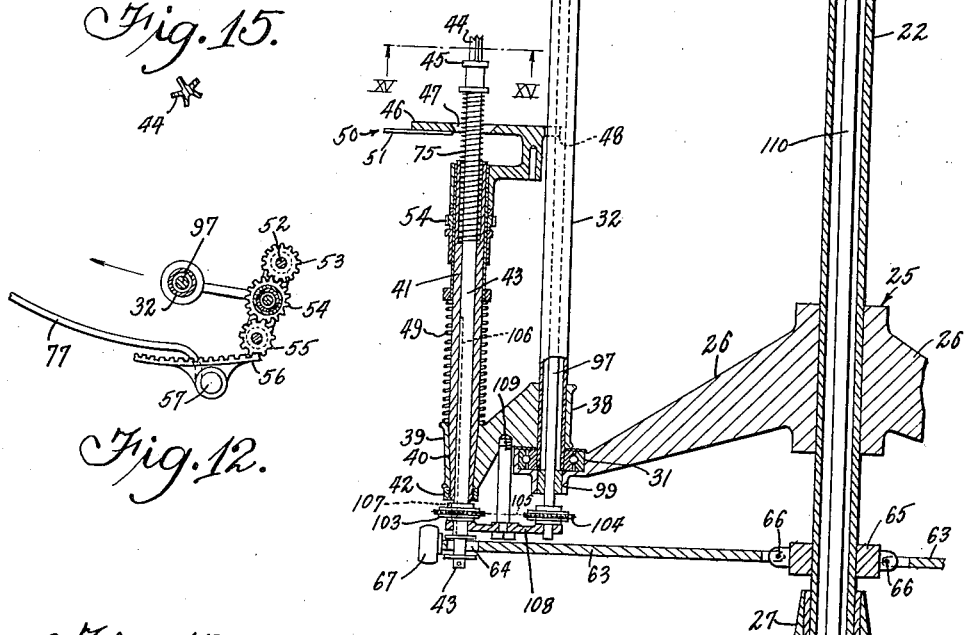

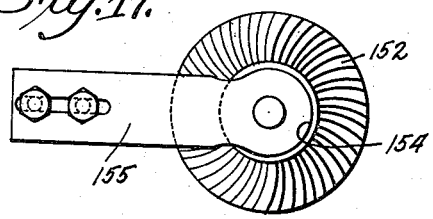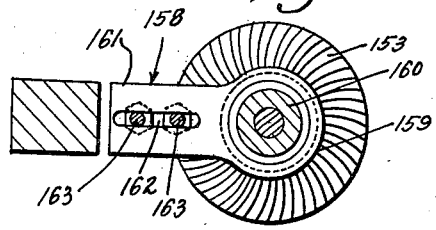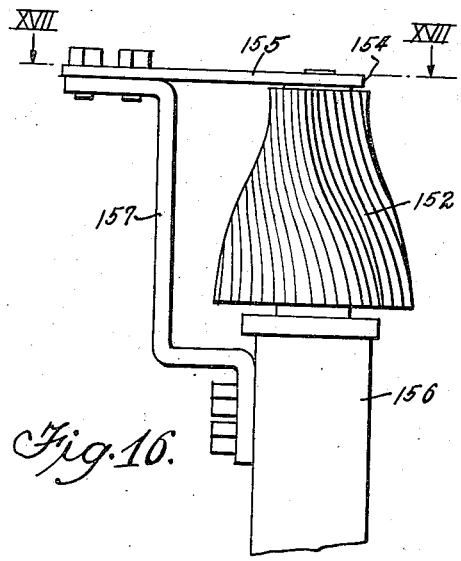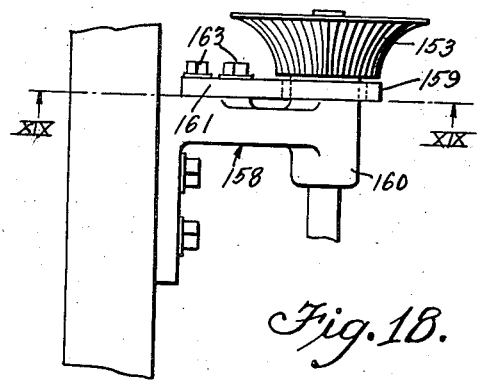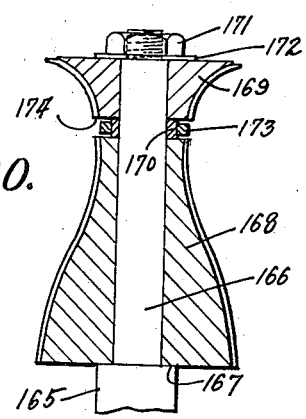

Patented June 29, 1937

2,085,225

UNITED STATES PATENT OFFICE 2,085,225

PARING MACHINE

Roy G. Lucks, Portland, Oreg., assignor to California Packing Corporation, San Francisco, Calif., a corporation of New York Application May 7, 1934, Serial No. 724,290

16 Claims. (Cl. 146—43)

This invention relates to a machine for paring fruit for canning or other purposes.

The machine and mechanisms of this invention have been illustrated and will be described as especially adapted for the paring of pears, but it is to be understood that this invention is readily adaptable for the paring of other fruits, vegetables, or objects.

It is an object of this invention to provide means operable during the paring operation, for predetermining the longitudinal shape of the pear, and for paring the transverse periphery thereof to a shape similar to that of its major transverse periphery.

A further object is to provide paring means arranged to leave a portion of the fruit unpared and for providing a guide means engageable with the unpared portion thereof for predetermining the amount of body which the paring means may remove from the fruit.

A further object is to provide a second paring means for paring that portion or portions of the fruit left unpared by the first paring means, and for providing a second guide means engageable with a portion of the fruit pared by the first paring means for predetermining the amount of body which the second paring means may remove therefrom.

A further object is to provide paring means arranged to leave a portion of the object unpared, and for providing guide means engageable with the unpared portion thereof in alignment with the paring cut for predetermining the amount of cut which the paring means may remove from the object.

A further object is to provide a second paring means for paring that portion or portions of the object left unpared by the first paring means, and for providing a second guide means engageable in alignment with the paring cut with a portion of the object pared by the first paring means for predetermining the amount of cut which the second paring means may remove from the object.

A further object is to provide the machine with floating pear-carrying spindles operable for yieldingly urging the fruit carried thereby into paring contact with the cutting means whereby the machine will successfully operate upon pears of different diameters without adjustment as well as successfully paring odd-shaped fruit, which fruit may vary considerably in diameter at different points around the periphery thereof.

A further object is to provide a guide means associated with the paring means and for providing said guide means with a directing surface concentrically arranged with relation to the paring means.

A further object is to provide means for adjusting the guide means with relation to the paring means.

A further object is to provide a supporting and turning means for the object to be pared, and for providing means for yieldingly urging the object impaled thereon, into engagement with the paring and guide means.

A further object is to provide means for centering and severing the stem end of the pear.

A further object is to provide means for trimming off and squaring up the calyx end of the pear.

A further object is to provide means operable for cutting the pears to a predetermined length, or automatically operable for severing a predetermined length from the neck end of the pear.

Other objects and advantages of the invention will become apparent as the nature of the same is more fully understood from the following description and accompanying drawings, wherein is set forth what is now considered to be a preferred embodiment. It should be understood, however, that this particular embodiment of the invention is chosen principally for the purpose of exemplification, and that variations therefrom in details of construction or arrangement of parts, may accordingly be effected and yet remain within the spirit and scope of the invention as the same is set forth in the appended claims.

In the drawings:

Figure 1 illustrates a pear before being operated upon by the paring machine of this invention.

Figure 2 illustrates the same pear after passing through the first paring operation of the machine. Note the unpared portion which forms the cam surface, which surface cams against the guide means for controlling the paring action.

Figure 3 illustrates the same pear after passing through the second paring operation.

Figure 4 illustrates the same pear after the surplus ends have been severed therefrom.

Figure 5 illustrates a sectional view taken substantially in the plane of line V—V of Fig. 4, and depicts the oval or out of round form of the pear.

Figure 6 illustrates a fragmental plan view of the paring machine.

Figure 7 illustrates a front elevational view of Fig. 6.

Figure 8 illustrates an enlarged sectional view taken substantially in the plane of the line VIII—VIII of Fig. 6.

Figure 9 illustrates a sectional view of the first paring means.

Figure 10 illustrates a sectional view taken in the plane of line X—X of Fig. 9.

Figure 11 illustrates a sectional view of the second paring means.

Figure 12 illustrates a sectional view taken substantially in the plane of line XII—XII of Fig. 7.

Fig. 13 illustrates a sectional view taken substantially in the plane of line XIII—XIII of Fig. 7.

Figure 14 illustrates a fragmental side view of the cam means shown in Fig. 13.

Figure 15 illustrates an enlarged sectional view taken in the plane of line XV—XV of Fig. 8.

Figure 16 illustrates a modified form of the first peeling cutter and guide means therefor.

Figure 17 illustrates a plan view of Fig. 16.

Figure 18 illustrates a modified form of the second peeling cutter and guide means therefor.

Figure 19 illustrates a sectional view taken substantially in the plane of line XIX—XIX of Fig. 18, and Figure 20 illustrates a sectional view of a further modified form of peeling cutter and guide means.

The many features of this invention may be most advantageously incorporated in the turret type of paring machine. The turret head 20 may be provided with as many fruit carrying spindle assemblies 21 as desired. However, a four-spindle turret head has been selected for the purpose of illustration, and in order to simplify the drawings only one of the fruit spindle assemblies 21 has been shown.

The turret head 20 may be of any appropriate design and construction, as for example, the turret head may include a hollow turret shaft 22 to the upper end of which may be suitably mounted the upper turret spider 23 having four equally spaced radially extending arms 24, while a lower turret spider 25 may be mounted upon the turret shaft in spaced relation to the upper spider, and arranged whereby each of the four radially extending arms 26 thereof may be in alignment with the corresponding arms 24 of the upper spider. The turret shaft 22 may be operatively supported in suitable bearings 27, one of which bearings is illustrated in Figure 8 as securely fastened to the bed plate 28 of the machine frame, not shown, as by suitable screw means 29.

Between each of the corresponding spider arms 24 and 26 may be operatively mounted an appropriate fruit carrying or supporting means, as for example, the outer end of each of the spider arms 24 may be provided with a bearing 30 preferably of the antifriction type, and likewise, the outer end of each of the spider arms 26 may be provided with a bearing 31 also preferably of the antifriction type, for operatively mounting the hollow journal shafts 32. As each of the fruit supporting means may be alike, only one will be described in detail. As may be noted in Figure 8, the arm 33 may be suitably fastened upon the hollow shaft 32 just below the upper shaft supporting bearing 30, and the free end of arm 33 may be provided with a bearing boss 34, through which bearing boss the impaling blade shaft 35 may be operatively mounted. A fruit impaling blade 36 may be appropriately mounted upon the inner end of the shaft 35, and the impaling blade may be provided with a stop shoulder 37 against which shoulder the calyx end of the fruit may be gauged during the operation of impaling the fruit upon the blade, thus insuring the same positioning of each piece of fruit.

As may be observed, the stop shoulder 37 will act to positively position the blossom or calyx end of each piece of fruit in exactly the same relative position with respect to the paring means. This is an important feature for it has been found that the cores of all pears, of approximately the same diameter, are substantially at the same distance from the calyx end thereof, regardless as to the length of these pears. Therefore, it is important to provide a fixed stop shoulder, such as 37, and to positively locate the calyx of each piece of fruit thereagainst, whereby this position may be used as the basis for the shaping and peeling operations. In this way the relation of the core with respect to the calyx end, may be preserved and made use of in a subsequent mechanical coring operation wherein the calyx end of the shaped and peeled pieces of fruit may be utilized to correctly locate the fruit with relation to the coring means.

An arm 38 may be suitably fastened upon the hollow shaft 32 just above the shaft supporting bearing 31, and the free end of arm 38 may be provided with a boss 39 having a tapered bore 40 for receiving the correspondingly tapered end of the hollow spindle 41 securely fastened therein as by means of nut 42 threaded upon the lower end thereof. The hollow spindle 41 may be in alignment with the impaling blade shaft 35, whereby the impaling spear shaft 43 slidably mounted therein, will likewise be in alignment with the impaling blade shaft 35. A fruit impaling spear 44 of any appropriate form, as for example, as illustrated in Figures 8 and 15, may be suitably fastened upon the inner end of the impaling spear shaft 43, and provided with a stop shoulder 45 for limiting the impaling action of the spear into the stem end of the fruit.

It is desirable when running on pears, although not absolutely necessary, to provide means for centering the stem end of the pears with relation to the impaling spear, which means may include a centering plate 46 having a tapered opening 47 concentric with the axes of the impaling means for receiving and thereby centering the stem or neck end of the fruit. The centering plate 46 may be slidably mounted upon the hollow spindle 41 and prevented from rotating thereon by extending the rear portion thereof sufficiently to straddle the hollow shaft 32 as at 48, and a spring means 49 may be provided for yieldingly retaining the centering plate in its fruit centering position.

Often the stem emerges from the neck of the pear to one side of the axial center line thereof, that is, to one side of a line drawn from the calyx through the center of the core. However, this divergence of the stem in most cases, takes place in the small portion of the pear at the stem end thereof. This crookedness of the stem would render the proper centering of the pear during the impaling operation more difficult, and therefore to correct this condition, means have been provided for cutting off a sufficient portion of the stem end of pear at right angles to the axial center line thereof. It has been discovered in the case of crooked stem pears, that by so cutting off the neck of the pear, the stem will be found to be approximately in the center of the exposed section.

Any appropriate means may be provided for cutting off the stem end of the pears before the spear head 44 is impaled therein, which means may include rendering the tapered hole 47 of the centering plate of such size as to permit the neck of the pear inserted therein, to protrude therethrough, whereby upon the actuation of the stem cutter 50, the crooked stem portion will be cut from the pear, and thus in the surface of the pear exposed by the cutting operation, the stem will be located in the approximate center thereof.

The stem cutter 50 may include an arcuate cutting blade 51 mounted upon the cutter actuating shaft 52 and closely nested to the underside of the centering plate 46. By operatively positioning the cutting blade closely below the underside of the centering plate, that portion of the pear neck which protrudes through the tapered hole 47, will be sheared off as the cutting blade is swung across the hole. The driving or actuating means for the cutting blade may include providing an appropriate gear train including the gear pinion 53 fastened to the lower end of the cutter shaft 52 and meshing with an idler gear 54 journaled upon the centering head, which idler gear in turn meshes with the driving pinion 55, which, at a predetermined point in the travel of the turret head, is brought into mesh with the stationary quadrant gear 56, (note Figs. 7 and 12). The stationary quadrant gear 56 may be supported upon the standard 57, which standard in turn may be suitably mounted upon the bed plate 28.

Any suitable form of means may be provided for retaining the driving pinion 55 in operative engagement with the quadrant gear 56 during the cutting operation. One form of such means may include an arcuate cam 58 (note Figs. 13 and 14) suitably mounted upon the standard 57 at about the same height as that of the lower arm boss 39, whereby the cam roller 59 carried by the arm boss, may roll along the outer surface of the cam and will thus retain the driving gear in operative engagement with the quadrant gear during the turn of the turret head.

Upon the completion of the stem cutting operation the driving pinion 55 will roll off the end of the quadrant gear, and thereafter means become operative for yieldingly locking the stem cutter in a position retracted from the tapered hole of the centering head, which means may include a collar 60 fastened to the cutter shaft 52 and provided with a flattened peripheral portion 61 against which the flat spring 62 may act.

Means may be provided for automatically actuating the impaling spear, which means may include loosely connecting the outer end of the spear shaft 43 to the cam lever 63 as at 64, and pivotally mounting one end of the cam lever to the collar 65 by means of the pivot pin 66, while the other end thereof may be provided with a cam roller 67.

Each time the turret head stops, one of the fruit carrying assemblies 21 is stopped at the loading station. This position of the turret head and one of the fruit carrying assemblies is illustrated in Figure 7, wherein it may be noted that at the loading position the fruit impaling spear 44 will be retained in its retracted position by the cam lever roller 67 riding along the underside of the lowermost surface 68 of the impaling spear retracting cam 69, and to thus retain the spear out of the way during the fruit impaling operation.

To load the pear upon the fruit carrying assembly presented at the loading station, the operator will push down the centering plate 46 against the action of the spring means 49 until the neck end of the pear may be positioned in the tapered hole thereof, and until the blossom or calyx end will clear the point of the impaling blade 36, then positioning the center of the calyx of the pear in alignment with the center line of the impaling blade 36, and thereafter permitting the spring means 49 to raise the centering plate and to thereby push the pear onto the impaling blade 36. The fruit will be pushed along the impaling blade until the calyx end thereof reaches the stop shoulder 37, thereby correctly locating the calyx end of all of the pears treated in the machine to the same relative position with respect to the first paring means.

After the pear has thus been impaled, the turret head may be rotated a quarter of a turn to present the fruit impaled upon the fruit carrying assembly to the first paring means.

Any of the common well-known forms of intermittent driving means may be utilized for intermittently rotating the turret head. As the common forms of intermittent turret head driving means are so well known, it is not deemed necessary to illustrate and describe such driving means. It is deemed sufficient to say that an intermittent driving means may be provided for intermittently rotating the turret head through 90 degrees. However, should more or less stations be employed, it would be necessary to accordingly modify the intermittent driving means.

During the rotation of the turret head to successively advance the fruit carrying spindles from the loading station to the first paring station, it is advantageous to utilize this rotation to accomplish, first, the cutting off of the stem end of the pear; second, the impaling of the spear into the neck end of the pear and finally the retraction of the centering plate. As the turret head turns, the driving pinion 55 will be brought into mesh with the quadrant gear 56, and held in mesh by the cam roller 59, whereby the stem cutter blade 51 which is mounted flush with the underside of the centering plate, will be rotated to cut off the stem end of the pear. Substantially upon the completion of the stem cutting operation, the cam roller 67 will engage the upper surface of the cam track 70 and through the cam lever 63 will cause the impaling spear shaft to push the impaling spear 44 upwardly into the stem end of the pear.

As a given lot of pears may vary considerably in length, it is desirable to provide means for actuating the impaling spear to insure that the spear will be correctly impaled in short as well as long pears, and for this purpose the upper end 71 of the cam track 70 may be formed as a separate member and pivotally mounted upon the bed plate 28 by a suitable bracket 72. An arcuate guide 73 may be fastened adjacent the free end of cam 71 and operate through a suitable opening formed through the bed plate, and a spring means 74 may be mounted upon the arcuate guide and acting between the bed plate and cam for yieldingly urging the cam to its uppermost position. By this resilient cam arrangement, the impaling spear 44 will be pushed into the pear until the stop shoulder 45 thereof engages the cut end of the pear whether the pear be long or short.

As the impaling spear 44 is projected upwardly through the center of the tapered hole formed in the centering plate, the spear will pierce the approximate center of the exposed face of the pear and will follow the approximate center line of the stem for the full of its length.

The impaling spear 44 is yieldingly urged toward the impaling blade 36 by the spring means 75 (note Fig. 8) to thereby hold the impaled pear firmly in position against the stop shoulder 37 of the impaling blade 36.

After the fruit is impaled upon spear 44, the cam roller 76 mounted upon the centering means (Fig. 7) will come into contact with cam 77 for retracting the centering means, until the latch 78 latches over the centering plate, and thus locks the centering means in its retracted position, in which position the centering means will clear the lower part of the paring means.

The paring means form one of the important features of this invention, and may be divided into two or more units and one or more of these units located at a single station, or as illustrated, the first paring unit may be located at the first paring station, while the second paring unit may be located at the next station, which will be referred to as the second paring station.

The first paring means may include a rotary cutter 79 having a cutting surface of predetermined contour for shaping while paring the fruit. A transverse groove 80 may be formed in the cutter and preferably located in the plane of minimum diameter thereof, which, of course, will correspond to the transverse plane of maximum diameter of the object being pared. A guide member 81 (Figs. 9 and 10) may be positioned in the cutter groove 80, whereby the directing edge or surface thereof, may direct and thereby control the extent of movement of the fruit into paring engagement with the cutting surface of the cutter, and thereby predetermine the depth of cut removed therefrom.

As illustrated in Fig. 9, the paring cutter 79 may be formed of an upper cutter 82, and a lower cutter 83, and the two cutters separated to form the guide groove 80 by a suitable collar 84. The two cutters and collar may be assembled upon the upper end of the first cutter shaft 85 and clamped against the shoulder 86 thereof by means of a suitable nut 87 and washer 88. It will be appreciated that each of the cutters may be built up of a number of separate cutters as indicated in broken lines in Fig. 9, whereby the shape of the cutter assembly may be changed to suit the particular shape of fruit being pared. The upper end of the first cutter shaft 85 may be journaled in suitable bearing means 89 carried upon the upper end of standard 90. The first cutter shaft 85 may be driven from the main driving mechanism, or by means of a separate motor, neither of which arrangements have been shown.

As the pear impaled upon the fruit carrying assembly approaches the first peeling station, the periphery thereof located preferably in the zone of maximum transverse diameter, will engage the guide member 81 and thus direct the pear into a predetermined peeling engagement with the first peeling cutter 79. Any appropriate means may be provided for swinging the fruit carrying assembly about shaft 32 as a center, which means may be arranged to yieldingly urge the fruit impaled thereon into paring engagement with the guide member 81. One form of such means is illustrated in Figures 6 and 7, wherein the lower arm 38 of the fruit carrying assembly may be provided with a suitable lug 91, to which the outer end of the spring shaft 92 may be pivotally connected while the intermediate portion thereof may be operatively supported in the bracket 93 mounted upon arm 26 of the lower turret head spider 25. The inner end of the spring shaft 92 may be threaded to receive a suitable thumb nut 94 operable for adjusting the compression of spring 95, which spring may be mounted upon the spring shaft and arranged to act between the bracket 93 and the thumb nut 94. A stop collar 96 may be mounted upon the spring shaft 92 and arranged to engage the bracket 93 in case the machine should be operated when no fruit has been impaled upon the fruit carrying assemblies in order to maintain sufficient clearance between the paring cutters and the several parts of the fruit carrying assemblies. By means of the thumb nut 94 the compression spring 95 may be adjusted to overcome the thrust of the paring cutter and to thereby hold the fruit in contact with the guide means 81 and cutter, with the proper degree of tension.

The turret head will come to rest as soon as the fruit carrying assembly is moved into the first paring station. Should the fruit carrying assembly be empty, that is, no fruit impaled thereon, the stop collar 96 will remain in engagement with the bracket 93, and to thus prevent the several parts of the fruit carrying assembly from being swung into destructive engagement with the first paring cutter, but should a pear or other fruit be impaled thereon, the assembly will be swung inwardly against the yielding action of spring 95 as the fruit engages and travels along the guide member 81, and thus the spring means 95 will be free to act to yieldingly retain the fruit in engagement with the guide means 81, and thereby in predetermined engagement with the paring cutter 79. Due to this arrangement, fruit of different sizes may be nicely pared by the machine without the need of making adjustments thereto, and the machine is accommodated to a variation in the diameter of individual pears at different points on their peripheries.

While the fruit carrying assembly is stopped at the first paring station, the impaling blade and spear may be rotated to in turn rotate the fruit impaled thereon, so as to present the entire circumference thereof, to the paring cutter. The fruit may be rotated through one or more revolutions as desired. It is to be understood that in all cases it may not be desirable to drive both the impaling blade and spear, and that in some instances, one or the other may be driven for rotating the fruit. Any appropriate means may be provided for rotating the impaling blades and spears, and one form of such means will be described for one of the fruit carrying assemblies, which means may include a pivot shaft 97 operatively supported in bearings 98 and 99 of the turret head spider arms 24 and 26 respectively. In Fig. 8 it may be observed that the pivot shaft extends through and is concentric with the hollow journal shaft 32 of the fruit carrying assembly, whereby this pivot shaft will remain equally spaced from the impaling blade shaft 35 and the impaling spear shaft 43, during the full range of swing thereof. This arrangement permits the impaling blade and spear shafts to be operatively connected to the pivot shaft either by suitable gears or sprockets and chains, as illustrated. The impaling blade shaft 35 may be driven from the pivot shaft by means of the sprockets 100, 101 and chain 102, while the impaling spear shaft 43 may be driven from the pivot shaft by means of the sprockets 103, 104 and chain 105. As the impaling spear shaft 43 reciprocates back and forth, it is desirable to provide the shaft with a keyway 106, and the sprocket 103 with a suitable key 107, and also to provide a bearing plate 108 mounted upon arm 38 by suitable screw means 109 for maintaining sprocket 103 in its operative position.

The pivot shaft may be intermittently driven by the main driving means, (not shown) through a suitable arrangement of shafts and gears, as for example, by means of the central shaft 110 journaled in and concentric with the hollow turret shaft 22, having a bevel driving gear 111 mounted upon the upper end thereof and arranged to drive the transverse shaft 112 by meshing with the bevel pinion 113. The transverse shaft may be journaled in bearings 114 and 115 of the turret spider arm 24, and provided at the outer end thereof with a driving bevel pinion 116 meshing with the pivot shaft bevel gear 117 and thereby driving the pivot shaft 97 and thereby driving the impaling blade and spear means as previously described.

The guide means 81 may extend through the groove 80 formed in the cutter 79 as clearly shown in Figures 9 and 10, and may be adjustably mounted with relation to the cutting edge thereof, whereby the extent to which the fruit may be fed into engagement with the cutter may be nicely adjusted. To render the guide means adjustable, the end thereof may be provided with a boss 117a arranged to be tightly clamped upon the upper end of the adjusting bar 118 as by means of a suitable bolt means 119, while the adjusting bar 118 may be in turn, adjustably mounted upon the bracket 120 of the standard 90.

If the lot of pears being run through the machine were more or less egg-shaped as illustrated in Fig. 1, these pears would not only be peeled, but also given the attractive shape of the usual Bartlett pears, and thus could be canned in the higher grades. The pear would appear as shown in Fig. 2 after the first peeling operation, wherein the unpeeled band 121 represents that portion of the fruit left unpeeled by the cutter groove 80, and also it is this band which acts as the cam surface to cooperate with the guide member 81 to regulate the depth of the peeling cut.

If it were not for the yieldable mounting of the fruit carrying assembly controlled by the guide member 81 camming against the belt 121 of the fruit, the out of round portions 122 located between the full line periphery and the broken line, as illustrated in Fig. 5, would be peeled away and thereby cause an unnecessary waste; or, if the pear supporting spindle were adjusted so as not to waste the out of round portions 122 of the fruit, then the intermediate portions of the pear would be left unpeeled. Thus it will be seen that by providing for a relative motion between the axes of the cutter and fruit, and controlling the peeling position of the fruit with relation to the cutter by the guide member 81 camming against the major transverse axis of the pear in substantial alignment with the line of cut, that pears which are considerably out of round, may be completely peeled, and that the peeled pear will retain its original out of round shape.

It is now desirable to peel the cam belt section 121 in such a way as to maintain a smooth unbroken contour, and also the same original out of round transverse section. This operation may be performed at a second paring station, by means of a rotating cutter 123 (Figs. 6, 7 and 11), keyed to a driving shaft 124 as by any suitable means, such as the set screw 125. As may be observed in Fig. 7, shaft 124 may be supported adjacent its upper end in the bearing 126 carried by the standard 127, and may be driven by a separate motor or other suitable means, not shown. A guide member 128 may be adjustably supported upon the standard 127, as by means of the screw 129, to facilitate the positioning of member 128 with relation to the cutting edge of the belt cutter 123. It is preferable to position the guide member 128 so that the previously peeled portion of the pear located just below the unpeeled cam belt 121, will cam thereagainst, and as the particular transverse shape of the pear being operated has previously been translated to this peeled section, it follows that the peeling of the cam belt section 121 will conform closely to its original transverse contour.

It is preferable to make the cutting edges of the cutter 123 somewhat wider than the width of the unpeeled cam belt 121 and of such contour as to fully remove the unpeeled belt 121 and blend this newly peeled section into the section previously peeled by the cutter 79 so that the pear leaving the second peeling station will be fully peeled excepting for a relatively small section contiguous with the calyx end of the pear, as illustrated in Fig. 3. By properly shaping the cutter 123, the longitudinal contour of the pear will be smooth and without a break, and the fruit will have the appearance of having been peeled by a single cutter.

Before the fruit is discharged from the machine, it is desirable to trim off both the calyx and stem ends thereof, which operations may be performed as the turret swings the fruit carrying assembly from the second peeling station to the fourth station.

The calyx end of the pear may be trimmed by a curved stationary blade 130 carried by an arcuate blade holder 131, which blade holder may be fastened at one end to the standard 127 while at a point spaced therefrom, to a standard 132, while the stem end of the pear may be trimmed by the curved blade 133, which blade may be raised or lowered to correspond to the height to which the impaling spear is moved upwardly to impale the fruit; that is, the stem end trimming blade 133 is automatically positioned to engage the neck end of the pear just above the upper end of the impaling spear 44. In order to render the stem end trimming blade 133 adjustable, this blade may be securely fastened to a sleeve member 134 slidably mounted upon the standard 132, and a spring means 135 may act between the bed plate 28 and the flanged lower end of the sleeve to yieldingly maintain the sleeve and thus the blade 133 at the upper limit of its travel.

Due to the variation in the length of the different pears, the impaling spear may be raised to different heights when impaled in a relatively long pear, as compared with its position when impaled in a relatively short pear. For this reason, it is advisable to automatically control the position of the stem end trimming blade 133 from the impaling spear, and for this purpose the positioning cam-way 136 may be securely mounted to the lower end of the blade supporting sleeve. This cam-way may be formed as an arc of a circle having a radius equal to the radius of the circle scribed by the cam roller 67 carried by the cam lever 63, which lever is connected to the impaling spear shaft 43, and the cam-way 136 may have its forward end inclined as illustrated at 137. By this arrangement, as the turret head swings the fruit carrying assembly from the second peeling station to the fourth station, the cam roller 67 will engage the inclined surface of the cam-way 136, and as the turret continues to rotate, the cam roller 67 will cause the cam-way 136 and thereby sleeve 134 and trimming blade 133 to be lowered until the cam roller rides onto the horizontal portion of the cam-way, at which point the trimming blade 133 will just clear the upper end of the impaling spear 44. During the rotation of the spear at the fourth station, the trimming blades 130 and 133 will act to trim the respective ends of the pear, which will now be fully pared as illustrated in Fig. 4. However, in some instances, it may be preferable to use a relatively long spear, in which instances the trimming blade may be arranged to just contact the spear while performing the cutting operation.

To prevent the cam-way 136 from turning out the path of the cam roller 67 when engaged thereby, a standard 138 may be provided in spaced relation to the standard 132, and to this standard the blade 133 and cam-way 136 may be slidably connected by bearings 139 and 140 (Fig. 7). Also this standard may be utilized for bracing the free end of the blade holder 131.

During the next swing of the turret, the pared piece of fruit will leave the machine, and the fruit impaling spear 44 will be returned to its retracted position. To retract the impaling spear, the forward end 141 of the retracting cam 69 may be elevated as at 142, so that the cam roller 67 will engage the underside thereof, and as the cam roller 67 travels down the inclined surface 143 of cam 69, the cam arm 63 will be swung down to in turn retract the shaft 43 which carries at its upper end the impaling spear 44.

The forward end 141 of the retracting cam 69 may be maintained by means of bracket 144 above the maximum height to which the cam roller 67 may rise, so as to insure the travel of the cam roller along the underside thereof.

In the operation of the machine, each time a spindle is stopped at the loading station, the attendant will place the stem end of the pear in the tapered hole 47 of the centering plate 46, and center the calyx end thereof with relation to the impaling blade 36. During the swing of the turret from the loading station to the first peeling station, the stem cutter 59 will be brought into action to cut off a short section from the stem end of the pear, and thereafter the cam roller 67 will engage the impaling cams 70 and 71 to force the impaling spear 44 into the stem end of the fruit, while at the same time impaling the fruit onto the impaling blade 36. Also during this swing of the turret, the centering plate with its attached parts will be retracted by cam 77, and latched in its retracted position.

At, or just prior to the arrival of the first loaded spindle at the first peeling station, the fruit is caused to rotate so as to present all sides thereof to the action of the rapidly rotating peeling and forming cutter 79 and the pear in cooperation with guide member 81, predetermines the depth of cut as previously described.

It will be noted that due to the unpeeled portion of the fruit camming against the guide member 81, that even though the pear be turned through several revolutions, the predetermined depth of cut will only be taken once in the fruit, as the unpeeled cam belt will hold the fruit out of range of the cutting edges of the cutter after the predetermined cut has been taken.

As the first spindle arrives at the first peeling station, the second spindle arrives at the loading station, and during the time the turret head is stationary, the first pear is peeled and a second pear placed in the next spindle.

At the second peeling station the unpeeled cam belt 121 will be peeled while the second impaled pear is being peeled at the first peeling station, and a pear placed in the third spindle arriving at the loading station.

The next move of the turret brings the first pear, which has now been fully peeled, to the trimming station where, as previously described, the stem end trimming blade is automatically positioned to cut the stem end of the pear off just above the upper end of the impaling spear, while the calyx end of the pear is trimmed by the blade 130. It will be appreciated that the pear is rotated during its stay at the first and second peeling stations, and while at the trimming station. After the trimming operation, the pear is fully pared as illustrated in Fig. 4, and thus leaves the machine.

During the final swing of the turret, the impaling spindle is retracted, and also the centering plate latch released.

The means for releasing the centering plate latch may include a lever 146 pivotally mounted upon the arm 26, as at 147. The lever 146 may carry a horizontally projecting tripping pin 148 positioned to be engaged by the lower edge of the arcuate cam 58 carried by the standard 57. When the tripping pin rides under the downwardly tapered cam surface 58$^a$ of cam 58, the free end of lever 146 will be swung downwardly, and this motion may be utilized for releasing latch 78 to in turn release the centering plate 46. This motion of the lever 146 may be communicated to the latch 78 by means of a rod 149 connecting the free end of lever 146 with the arm 150 of the latch. A spring means 151 may be provided for normally and yieldingly retaining the latch in position to engage and lock the centering plate. The tripping pin 148 rides off of the cam 58 before the spindle arrives at the loading position.

Each spindle carrying a pear is processed through the same course as described for the first spindle. The actuation of the machine is rapid and efficient, and pears treated in this machine will not only be peeled, but simultaneously shaped to a more attractive form in a longitudinal plane, while transversely the fruit may retain its original out of round shape. By the retention of that out of round portion which would otherwise be cut away, as indicated in Figure 5, between the full and broken lines, the wastage of pears treated on my machine is less than would be the case should the same pears be peeled by machines which would remove this out of round portion.

At the present time, on account of the unattractive shape of some pears, these odd or poorly shaped pears must be canned in low grades, whereas should these same pears be shaped as by means of my machine to a more attractive form in a longitudinal plane, they may be canned into high grades. It will, therefore, be appreciated that one of the purposes of this machine is to shape pears to a more attractive form in a longitudinal plane while preserving the relative transverse diameters at different points on the periphery of the pear, thus minimizing the waste.

Pears are packed in cans according to certain counts per can, and these pears are selected according to the diametrical size in the plane of greatest diameter; hence it is extremely important that the waste be minimized and the original diametrical size of the pear be as closely maintained as is possible during peeling operation. This important requirement is nicely accomplished by the machine of this invention wherein the pears are not only given an attractive shape, but the depth of peel taken by the form cutters is substantially the same around the periphery in any given plane even though the pear under treatment is very much out of round.

A modified form of the first and second peeling cutters with their respective guide means, is illustrated in Figures 16 to 19. In this modified arrangement the first peeling cutter 152 peels only the lower half portion of the fruit presented thereto, while the second peeling cutter 153 completes the peeling operation. Of course, it will be appreciated that by making the proper adjustments, the peeling operations may be reversed.

As may be observed in Figs. 16 and 17, the guide means against which the unpeeled portion of the fruit cams, to control the depth of the peeling cut taken by the cutter 152, has also been modified. The directing edge 154 of the guide member 155 is in the form of an arc having its center of curvature substantially coincident with that of the axis of the cutter. Due to this arrangement, any point at which the fruit may engage the directing edge 154, the depth of cut taken at that point will be substantially the same as for any other point thereabout. This condition may vary slightly for different adjustments for the guide member, but the differences will be so small as to be negligible. The guide means 155 may be adjustably mounted upon the cutter supporting standard 156, as by means of the bracket 157, as will be well understood from the Figures 16 and 17.

Likewise, the guide means 158 may be provided with a directing edge 159 in the form of an arc of a circle having its center of curvature coincident with the axial center of the second peeling cutter 153, and may be adjustably mounted upon the cutter supporting bearing 160 by providing the shank 161 of the guide member with a slot 162, through which the clamping bolts 163 may freely pass. After adjusting the guide member the bolt means may be tightly screwed down to securely clamp the guide means in its adjusted position.

In some instances, it may be desirable to modify the construction of the peeling cutter assembly so as to journally mount an annular guide member thereon. Such a modified form of cutter assembly is illustrated in Fig. 20, wherein a driving shaft 165 may be provided at its upper end with a section 166 of reduced diameter, whereby a shoulder 167 may be formed between the shaft and this section, against which shoulder the lower peeling and forming cutter 168 may be seated. The upper peeling cutter 169 may be spaced from the lower cutter 168 as by means of the collar 170 and the two cutters with collar located therebetween, securely mounted upon the section 166 as by means of the nut 171 threaded upon the extreme end of section 166 and the washer 172. The guide member 173 of this assembly may be in the form of an annular ring mounted in the groove 174 formed between the upper and lower cutter. It will be understood, of course, that the guide member 173 would be placed in groove 174 before the upper cutter has been assembled onto the unit.

One reason for journally mounting the guide ring upon the cutter assembly, is to permit the guide ring to rotate at the speed of the pear camming thereagainst, instead of rotating at the cutter speed, and thereby preventing guide ring from rubbing against the skin of the fruit at a relatively high speed, which might otherwise cause an injury to the fruit, especially when this form of guide ring is used in conjunction with the second peeling cutter whereat the peeled surface of the fruit will cam directly thereagainst.

In this modified assembly the depth of cut may be increased or decreased by putting on guide rings of greater or smaller external diameter.

Of course, it is to be understood that should it be desired, the guide ring may be formed as a part of the collar, so as to rotate with the cutter.

It is to be understood that floating mounting of the fruit supporting means upon the turret head and the stationary mounting of the cutter means, may be reversed, that is, the cutters made to yieldingly swing into operative engagement with the fruit carried upon the turret head by relatively fixed impaling means thereof.

Having fully described the invention, it is to be understood that it is not to be limited to the details set forth, but the invention is of the full scope of the appended claims.

I claim:

1. In a paring machine, supporting and turning means for the object to be pared, first cutter means having a cutting surface of predetermined contour for shaping while paring the object, a first guide means positioned adjacent one end of the cutter means and arranged to engage the unpared peripheral portion of the object in alignment with the article engaging portion of the cutter means for predetermining the cutting depth of said cutting means, means for yieldingly urging the object and guide means into operative engagement, second cutter means having a cutting surface of predetermined contour for paring that portion of the object left unpared by the first cutter means, a second guide means positioned adjacent one end of the cutter means and arranged to engage the peripheral portion of the object which was pared by the first cutter for predetermining the cutting depth of the second cutting means, and means for yieldingly urging the object and second guide means into operative engagement.

2. In a paring machine, supporting and turning means for the object to be pared, cutter means rotating about an axis spaced from the axis of the object and having a cutting surface of predetermined contour for shaping while paring the object, said cutting surface being interrupted in a transverse plane for leaving a portion of the object unpared, and guide means cooperating with that portion of the object left unpared by the interrupted portion of the cutter for controlling the depth of cut taken in the object by said cutter means.

3. In a paring machine, supporting and turning means for the object to be pared, cutter means rotating about an axis spaced from the axis of the object and having a cutting surface of predetermined contour for shaping while paring the object, said cutting surface being interrupted in a transverse plane, and an adjustable guide means mounted in the interrupted portion of the cutter means operable for predetermining the depth of cut taken in the object by said cutter means.

4. In a paring machine, supporting and turning means for the object to be pared, first cutter means rotating about an axis spaced from the axis of the object and having a cutting surface of predetermined contour for shaping while paring the object, said cutting surface being interrupted in a transverse plane thereof, first guide means operatively mounted within the interrupted portion of the first cutter means, means for yieldingly urging the object and first guide means into operative engagement, second guide means arranged to engage a portion of the pared object in a predetermined plane thereof, second cutter means rotating about an axis spaced from the axis of the object and maintained in predetermined relation to the second guide means for shaping while paring that portion of the object left unpared by the interrupted portion of the first cutter means, and means for yieldingly urging the object and second guide means into operative engagement.

5. In a paring machine, a supporting and turning means for the object to be pared, a first guide means arranged to engage the object in a predetermined plane thereof, a first paring cutter means rotating about an axis spaced from the axis of the object and maintained in predetermined relation to the first guide means for paring a portion of the object not including that portion engaged by said guide means, means for yieldingly urging the object and guide into operative engagement, a second guide means arranged to engage a portion of the pared object in a predetermined plane thereof, a second cutter means rotating about an axis spaced from the axis of the object and maintained in predetermined relation to the second guide means for paring the portions of the object left unpared by said first cutter, and means for yieldingly urging the object and second guide means into operative engagement.

6. In a paring machine, a supporting and turning means for the object to be pared, a guide means arranged to engage the object in a predetermined plane thereof, a paring cutter rotating about an axis spaced from the axis of the object and maintained in predetermined relation to the guide means for paring a portion of the object not including that portion engaged by said guide means, and means for yieldingly maintaining the object and guide in operative engagement.

7. In a paring machine, supporting and turning means for an object, rotary cutter means fixed against longitudinal movement with respect to the object operative for paring a portion of the object equal in length to the length of the cutter, means for rotating the cutter on its longitudinal axis, and guide means arranged to cam against that portion of the object left unpared by the cutter for predetermining the depth of cut which the cutting means may remove from the object.

8. In a paring machine, supporting and turning means for an object, rotary cutter means fixed against longitudinal movement with respect to the object operative for paring a portion of the object equal in length to the length of the cutter, means for rotating the cutter on its longitudinal axis, and guide means arranged to cam against that portion of the object left unpared by the cutter for predetermining the depth of cut which the cutting means may remove from the object and said guide means being located substantially in the object engaging plane of said cutting means.

9. In a paring machine, supporting and turning means for the object, rotary cutter means fixed against longitudinal movement in respect to the object operative for paring a portion of the object equal in length to the length of the cutter, means for rotating the cutter on its longitudinal axis, guide means arranged to cam against that portion of the object left unpared by the cutter for predetermining the depth of cut which the cutting means may remove from the object and said guide means being located substantially in the object engaging plane of said cutting means, and means for yieldingly urging the object and guide into operative engagement.

10. In a paring machine, a supporting and turning means for the object to be pared, a guide means arranged to engage an unpared portion of the object, a paring and shaping cutter rotating about an axis spaced from the axis of the object and arranged to engage a portion of the object different from that engaged by the guide means, and said cutter having an effective cutting surface substantially equal in length to the full width of cut to be removed from the object, and means for yieldingly maintaining the object and guide means in operative engagement.

11. In a paring machine, means for rotating an object about its longitudinal axis, a rotary cutter means arranged to rotate about an axis parallel to the rotative axis of the object, said object and cutter means being fixed against relative longitudinal movement along their respective axes, means for causing the object and cutter to be brought into operative engagement, said cutter means having an effective cutting length less than the length of the object whereby a peripheral portion of the object will be left unpared upon the completion of the paring operation, and a guide means associated with the cutter and arranged to engage the unpared portion of the object for controlling the depth of cut which may be removed from the object by the cutter.

12. In a paring machine, means for rotating an object about its longitudinal axis, a rotary cutter having a predetermined contour for shaping while paring the object and arranged to rotate about an axis parallel to the rotative axis of the object, said object and cutter being fixed against relative longitudinal movement along their respective axes, means for causing the object and cutter to be brought into operative engagement, said cutter means having an effective cutting length less than the length of the object whereby a peripheral portion of the object will be left unpared upon the completion of the paring operation, and a guide means associated with the cutter and arranged to engage the unpared portion of the object for controlling the depth of cut which may be removed from the object by the cutter.

13. In a paring machine, means for rotating an object about its longitudinal axis, a rotary cutter means arranged to rotate about an axis parallel to the rotative axis of the object, said object and cutter means being fixed against relative longitudinal movement along their respective axes, means for yieldingly causing the object and cutter to be brought into operative engagement, said cutter means having an effective cutting length less than the length of the object whereby a peripheral portion of the object will be left unpared upon the completion of the paring operation, and a guide means associated with the cutter and arranged to engage the unpared portion of the object for controlling the depth of cut which may be removed from the object by the cutter.

14. In a paring machine, supporting and turning means for the object to be pared, a rotary paring and shaping cutter arranged to leave a circumferential portion of the object unpared and having an effective cutting surface substantially equal in length to the full width of cut to be removed from the object, and said cutting surface having a predetermined contour for giving the object for the width of the cut a shape complementary to the predetermined contour of said cutting surface, means for rotating said cutter on its longitudinal axis, and a guide means cooperating with the cutter and arranged to engage the circumferentially unpared portion of the object in substantial alignment with the point of engagement of the cutting surface of the cutter with the object for controlling the depth of cut which the cutter may remove from said object.

15. In a paring machine, supporting and turning means for an object to be pared, a paring and shaping cutter arranged to leave a circumferential portion of the object unpared and having an effective cutting surface substantially equal in length to the full width of cut to be removed from the object, and said cutting surface having a predetermined contour for giving the object for the width of cut a shape complementary to the predetermined contour of said cutting surface, means for rotating the cutter about its longitudinal axis, and a guide means arranged to cam against the circumferential unpared portion of the object for controlling the depth of cut which the cutter may remove from the object.

16. In a paring machine, supporting and turning means for an object to be pared, a paring and shaping cutter arranged to leave a circumferential portion of the object unpared and having an effective cutting surface substantially equal in length to the full width of cut to be removed from the object, and said cutting surface having a predetermined contour for giving the object for the width of cut a shape complementary to the predetermined contour of said cutting surface, means for rotating the cutter on its longitudinal axis, means for yieldingly urging the cutter into cutting relation with the object, and a guide means arranged to cam against the circumferentially unpared portion of the object for controlling the depth to which the cutter may enter the object.

ROY G. LUCKS.